US 9,691,527 B2

(12) United States Patent
Adachi et al.

(10) Patent No.: US 9,691,527 B2
(45) Date of Patent: Jun. 27, 2017

(54) SHIELDING STRUCTURE AND WIRE HARNESS USING CONDUCTIVE RESIN MOLD AND NON-METALLIC FIBER BRAID

(71) Applicant: Yazaki Corporation, Tokyo (JP)

(72) Inventors: Hideomi Adachi, Kosai (JP); Yoshiaki Ozaki, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 367 days.

(21) Appl. No.: 14/225,975

(22) Filed: Mar. 26, 2014

(65) Prior Publication Data

US 2014/0202763 A1    Jul. 24, 2014

Related U.S. Application Data

(63) Continuation of application No. PCT/JP2012/075731, filed on Sep. 27, 2012.

(30) Foreign Application Priority Data

Sep. 27, 2011 (JP) .................................. 2011-210098

(51) Int. Cl.
*H01B 17/42* (2006.01)
*H02H 3/02* (2006.01)
*B60R 16/02* (2006.01)
*H01R 13/6592* (2011.01)
(Continued)

(52) U.S. Cl.
CPC ......... *H01B 17/42* (2013.01); *B60R 16/0215* (2013.01); *H01R 13/504* (2013.01); *H01R 13/6592* (2013.01); *H01R 13/6599* (2013.01); *H02H 3/02* (2013.01)

(58) Field of Classification Search
None
See application file for complete search history.

(56) References Cited

U.S. PATENT DOCUMENTS 3,576,940 A * 5/1971 Stone ..................... H01B 7/295
174/113 R
4,237,174 A * 12/1980 Lagardere ............... B29C 61/10
138/168

(Continued)

FOREIGN PATENT DOCUMENTS

JP        5-69874 U      9/1993
JP       09-148089 A     6/1997
(Continued)

OTHER PUBLICATIONS

Electromagnetic shielding using superconductors. Alok. Jan. 1994. Applied Superconductivity. http://www.sciencedirect.com/science/article/pii/0964180794900477.*

(Continued)

*Primary Examiner* — Chau N Nguyen
*Assistant Examiner* — Muhammed Azam
(74) *Attorney, Agent, or Firm* — Sughrue Mion, PLLC

(57) ABSTRACT

A shielding structure includes a conductive resin molded product, and a non-metallic fiber braid which is formed in a tubular shape by using multiple ultrathin strands made of conductive non-metallic fibers. A distal end of the non-metallic fiber braid is welded to the conductive resin molded product in the shielding structure.

7 Claims, 7 Drawing Sheets

(51) Int. Cl.
    *H01R 13/504*    (2006.01)
    *H01R 13/6599*    (2011.01)

(56)            References Cited

U.S. PATENT DOCUMENTS

| | | | | |
|---|---|---|---|---|
| 4,940,820 | A * | 7/1990 | Pithouse | B29C 66/73715 112/440 |
| 5,466,175 | A | 11/1995 | Onoda | |
| 5,593,524 | A * | 1/1997 | Philips | H01B 13/268 156/244.12 |
| 5,726,851 | A * | 3/1998 | Knapp | H01H 85/041 337/159 |
| 6,828,501 | B2 * | 12/2004 | Eves | H01B 7/0266 174/109 |
| 7,052,567 | B1 * | 5/2006 | Blackmore | B29C 35/0272 138/98 |
| 7,503,776 | B1 * | 3/2009 | Pavlovic | H01R 4/46 439/455 |
| 8,368,405 | B2 * | 2/2013 | Siebens | G01R 1/0416 324/538 |
| 9,346,420 | B2 * | 5/2016 | Adachi | B60R 16/0207 |
| 9,431,776 | B2 * | 8/2016 | Futakuchi | H01R 13/6683 |
| 9,531,113 | B2 * | 12/2016 | Ohyama | H01R 13/5205 |
| 9,573,535 | B2 * | 2/2017 | Yoshida | B60R 16/0215 |
| 2004/0099428 | A1 * | 5/2004 | Miyazaki | H01R 13/655 174/366 |
| 2004/0160377 | A1 * | 8/2004 | Aisenbrey | G06K 19/07749 343/789 |
| 2004/0235351 | A1 * | 11/2004 | Aisenbrey | H01R 13/6599 439/607.01 |
| 2005/0266729 | A1 | 12/2005 | Fukushima et al. | |
| 2006/0062715 | A1 * | 3/2006 | Endo | B82Y 30/00 423/447.2 |
| 2006/0098389 | A1 * | 5/2006 | Liu | B82Y 10/00 361/502 |
| 2006/0118194 | A1 * | 6/2006 | Mechler | F15B 15/1428 138/125 |
| 2009/0131575 | A1 * | 5/2009 | Handa | B82Y 30/00 524/496 |
| 2009/0226712 | A1 * | 9/2009 | Handa | C04B 35/62204 428/332 |
| 2010/0038131 | A1 * | 2/2010 | Belton | H01B 17/306 174/650 |
| 2010/0046189 | A1 | 2/2010 | Hasegawa et al. | |
| 2010/0126134 | A1 * | 5/2010 | Atkinson | D01H 1/00 57/204 |
| 2010/0203898 | A1 * | 8/2010 | Noldus | H04W 8/12 455/456.1 |
| 2010/0240228 | A1 * | 9/2010 | Lenhert | H01R 13/17 439/32 |
| 2010/0252184 | A1 * | 10/2010 | Morimoto | B82Y 30/00 156/241 |
| 2010/0258429 | A1 * | 10/2010 | Ugolin | B01J 8/0055 204/157.43 |
| 2010/0300749 | A1 * | 12/2010 | Adachi | B60R 16/0222 174/84 C |
| 2010/0307821 | A1 * | 12/2010 | Simonsohn | H02G 15/182 174/74 A |
| 2012/0227996 | A1 * | 9/2012 | Ardisana, II | H01B 7/182 174/34 |
| 2013/0008711 | A1 * | 1/2013 | Toyama | B60R 16/0215 174/70 R |
| 2013/0037321 | A1 * | 2/2013 | Murata | B60R 16/0215 174/72 A |
| 2013/0062095 | A1 * | 3/2013 | Huang | H01B 7/083 174/113 R |
| 2013/0299229 | A1 * | 11/2013 | Kato | H02G 15/02 174/377 |
| 2014/0202495 | A1 * | 7/2014 | Lv | A47L 1/03 134/6 |
| 2014/0216805 | A1 * | 8/2014 | Adachi | H01B 7/182 174/350 |
| 2014/0216812 | A1 * | 8/2014 | Adachi | B60R 16/0215 174/72 A |
| 2014/0251681 | A1 * | 9/2014 | Adachi | B29C 63/42 174/72 A |
| 2014/0284100 | A1 * | 9/2014 | Ichikawa | B60R 16/0215 174/70 R |
| 2014/0284102 | A1 * | 9/2014 | Ichikawa | B60R 16/0215 174/72 A |
| 2015/0274095 | A1 * | 10/2015 | Inao | H02G 3/0468 174/72 A |
| 2015/0289420 | A1 * | 10/2015 | Imahori | H01F 17/06 174/350 |
| 2016/0009234 | A1 * | 1/2016 | Adachi | H02G 3/0468 174/72 A |

FOREIGN PATENT DOCUMENTS

| | | |
|---|---|---|
| JP | 2000-083719 A | 3/2000 |
| JP | 2004-146532 A | 5/2004 |
| JP | 2004-178913 A | 6/2004 |
| JP | 2004-335770 A | 11/2004 |
| JP | 2005-339933 A | 12/2005 |
| JP | 2008-235190 A | 10/2008 |
| JP | 2009-093967 A | 4/2009 |
| JP | 2010-139763 A | 6/2010 |
| WO | 2008/108300 A1 | 9/2008 |
| WO | 2008/130333 A1 | 10/2008 |

OTHER PUBLICATIONS

Office Action dated Jul. 13, 2015 issued by The State Intellectual Property Office of The People's Republic of China in counterpart Chinese Application No. 201280046912.1.
Communication from the Japanese Patent Office dated May 19, 2015 in a counterpart Japanese application No. 2011-210098.
International Search Report (PCT/ISA/210), dated Jan. 24, 2013, issued by the International Searching Authority in counterpart International Patent Application No. PCT/JP2012/075731.
Written Opinion (PCT/ISA/237), dated Jan. 24, 2013, issued by the International Searching Authority in counterpart International Patent Application No. PCT/JP2012/075731.
"Flexo Conductive Shielding—Technical Data Sheet," Techflex, Jan. 1, 2009, 2 pages total, URL: http://www.techflex.com/specsheets/flexo_conductive.pdf.
"Glenair QwikConnect: EMI/RFI Braided Shielding Solutions," Glenair, Jul. 1, 2011, 33 pages total, URL: http://www.glenair.co.uk/graphics/QwikConnect/QC0711.pdf.
Notification of the Second Office Action issued on Feb. 3, 2016 by The State Intellectual Property Office of PR China in related Application No. 201280046912.1.
Communication issued Dec. 15, 2015, issued by the Japanese Patent Office in counterpart Japanese Patent Application No. 2011-210098.
Decision to Decline the Amendment communication dated Jun. 7, 2016, from the Japanese Patent Office in counterpart application No. 2011-210098.
Decision of Refusal communication dated Jun. 7, 2016, from the Japanese Patent Office in counterpart application No. 2011-210098.
Communication dated Jun. 29, 2016, from the State Intellectual Property Office of People's Republic of China in counterpart Application No. 201280046912.1.

* cited by examiner

# SHIELDING STRUCTURE AND WIRE HARNESS USING CONDUCTIVE RESIN MOLD AND NON-METALLIC FIBER BRAID

CROSS REFERENCE TO RELATED APPLICATIONS

This application is a continuation of PCT application No. PCT/JP20121075731, which was filed on Sep. 27, 2012 based on Japanese Patent Application (No. 2011-210098) filed on Sep. 27, 2011, the contents of which are incorporated herein by reference.

BACKGROUND OF THE INVENTION

1. Field of the Invention

The present invention relates to a shielding structure including a braid formed in a tubular shape, and a wire harness formed by adopting this shielding structure.

2. Description of the Related Art

A high-voltage wire harness for making electrical connection between devices installed in a vehicle such as an electric vehicle or a hybrid vehicle is specifically disclosed in, for example, JP-A-2005-339933. JP-A-2005-339933 is proposed by the present applicant. Description will hereinafter be made briefly.

In FIGS. 7A and 7B, a wire harness 1 is configured to include plural high-voltage electric wires 2, a braid shielding member 3 with which the plural high-voltage electric wires 2 are collectively covered, a shield shell 4 fixed to a shield case of a device (not shown), an annular member 5 held in the braid shielding member 3, and a band 8 whose diameter is shortened with tightening) of a bolt 6 and a nut 7. The annular member 5 and the band 8 are used in the case of fixing a distal end 9 of the braid shielding member 3 to an annular part 10 of the shield shell 4.

The braid shielding member 3 is made of a tubular braided conductor, and has a body part 11 and the distal end 9 continuous with this body part 11. The distal end 9 is formed so that an inside diameter of the distal end 9 becomes larger than an inside diameter of the body part 11. Concretely, the distal end 9 is formed so as to push out the inside diameter. The distal end 9 is formed in a double structure by folding this distal end 12 to the axial inside. This double structure is formed so as to have an outside distal end portion 13 and an inside distal end portion 14. The distal end 9 is formed so that the range as shown by reference numeral D corresponds to the distal end 9. The inside distal end portion 14 formed by the fold to the inside is formed in the range of reference numeral D.

In order to fix the distal end 9 of the braid shielding member 3 to the annular part 10 of the shield shell 4, work of inserting the braid shielding member 3 into the shield shell 4 is done so that the annular member 5 is first arranged between the outside distal end portion 13 and the inside distal end portion 14 and also the annular part 10 is positioned inside the inside distal end portion 14. When the annular part 10 is next crimped and tightening work of the band 8 is finally done from the outside of the outside distal end portion 13 according to a position of the annular part 10, the fixing is completed.

SUMMARY OF THE INVENTION

Incidentally, in the conventional art described above, in the case of fixing the distal end 9 of the braid shielding member 3 to the annular part 10 of the shield shell 4, there is a need to go through many work steps, so that there are problems that workability is bad and cost increases. Also, in the case of fixing the braid shielding member 3, the annular member 5, the bolt 6, the nut 7 and the band 8 are required, so that there is a problem that the number of components is large and management becomes complicated, or there is a problem that cost increases.

The invention has been implemented in view of the circumstances described above, and a problem of the invention is to provide a shielding structure and a wire harness capable of improving workability and also reducing the number of components and further reducing cost in the case of fixing a braid which is a shielding member.

According to one aspect of the present invention, there is provided a shielding structure, including
    a conductive resin molded product and
    a non-metallic fiber braid, formed in a tubular shape by using multiple ultrathin strands made of conductive non-metallic fibers,
    wherein a distal end of the non-metallic fiber braid is welded to the conductive resin molded product.

According to the invention having such a feature, the non-metallic fiber braid is formed by knitting the strands made of the non-metallic fibers having conductivity in a tubular shape. Then, the distal end of such a non-metallic fiber braid is welded to the conductive resin molded product. The conductive resin molded product is obtained by giving conductivity to a resin molded product. The non-metallic fiber braid is electrically joined to the conductive resin molded product by only welding the non-metallic fiber braid to the conductive resin molded product.

In the shielding structure as described above, the non-metallic fiber may be a carbon fiber or a conductive resin fiber in which a conductive material is mixed with a resin material.

According to the invention having such a feature, as the non-metallic fiber, the carbon fiber or the conductive resin fiber is used in the strand. When the conductive resin fiber is used in the strand, the resins are mutually welded to the conductive resin molded product, so that the fixing strength becomes sufficiently high. Also, when the same resin material is used in the conductive resin fiber and the conductive resin molded product, this molten state also becomes the same, with the result that a good fixing state can be obtained.

In the shielding structure as described above, the conductive resin molded product may be a fixing member capable of being fixed to the other member having conductivity.

According to the invention having such a feature, the conductive resin molded product is used as the fixing member and also this fixing member can be fixed to the other conductive member. In the case of the fixing member having conductivity, the fixing member can be used as an alternative to, for example, a metal shell. Also, the fixing member can be used as an alternative to a protector.

In the shielding structure as described above, the conductive resin molded product may be a pipe body having conductivity.

According to the invention having such a feature, the conductive resin molded product is used as the pipe body and also the non-metallic fiber braid is fixed by welding so as to continue with this pipe body. In the case of the pipe body having conductivity, the pipe body can be used as an alternative to, for example, a metal pipe.

According to another aspect of the present invention, there is provided a wire harness, including one or plural conducting paths, a non-metallic fiber braid formed in a tubular shape using multiple ultrathin strands made of conductive non-metallic fibers, the non-metallic fiber braid with which the one or plural conducting paths are covered, and a conductive resin molded product used as a destination of welding of a distal end of the non-metallic fiber braid.

According to the invention having such a feature, the wire harness including the shielding structure described above is obtained.

According to the invention described above, the shielding structure formed by using the non-metallic fiber braid and welding the distal end of this non-metallic fiber braid to the conductive resin molded product is obtained, so that the invention has effects capable of improving workability and reducing the number of components and reducing cost than ever before in the case of fixing the non-metallic fiber braid (braid) which is a shielding member. Concretely, the number of work steps is small and the need for an annular member, a bolt, a nut and a band is eliminated, so that the invention has the effects capable of improving workability and reducing the number of components and reducing cost.

According to the invention described above, the carbon fiber or the conductive resin fiber is given as the strand made of the non-metallic fiber, and use of any of the carbon fiber and the conductive resin fiber has the effects capable of improving workability and reducing the number of components and reducing cost.

According to the invention described above, the fixing member capable of being used as an alternative to, for example, a metal shell is used as the conductive resin molded product, so that the invention has an effect capable of obtaining the shielding structure with the same use form as the conventional art.

According to the invention described above, the conductive resin molded product is used as the pipe body, so that the invention has an effect capable of obtaining the shielding structure in which this pipe body is used as an alternative to, for example, a metal pipe.

According to the invention described above, the wire harness formed by adopting the shielding structure described above is obtained, with the result that the invention has an effect capable of providing the better wire harness capable of improving workability and reducing the number of components and reducing cost.

DETAILED DESCRIPTION OF THE EXEMPLARY EMBODIMENTS

The invention is a shielding structure formed by fixing a shielding member to a component having conductivity by welding, and is also a wire harness formed by adopting such a shielding structure.

First Embodiment

Figure 1A:
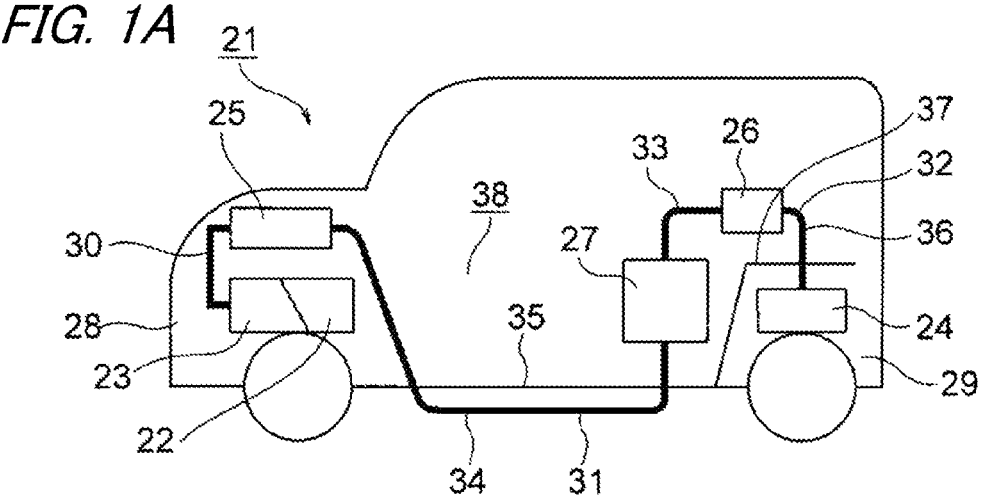
FIGS. 1A and 1B are diagrams showing a shielding structure and a wire harness of the invention according to the first embodiment.
Figure 1B:
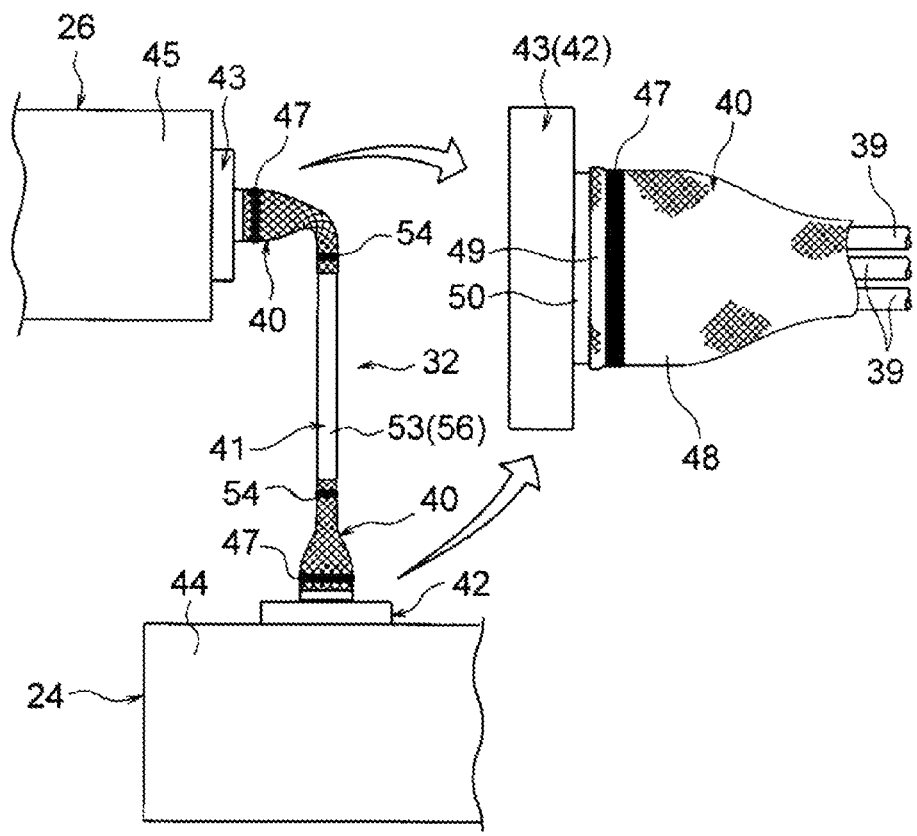
Figure 2:
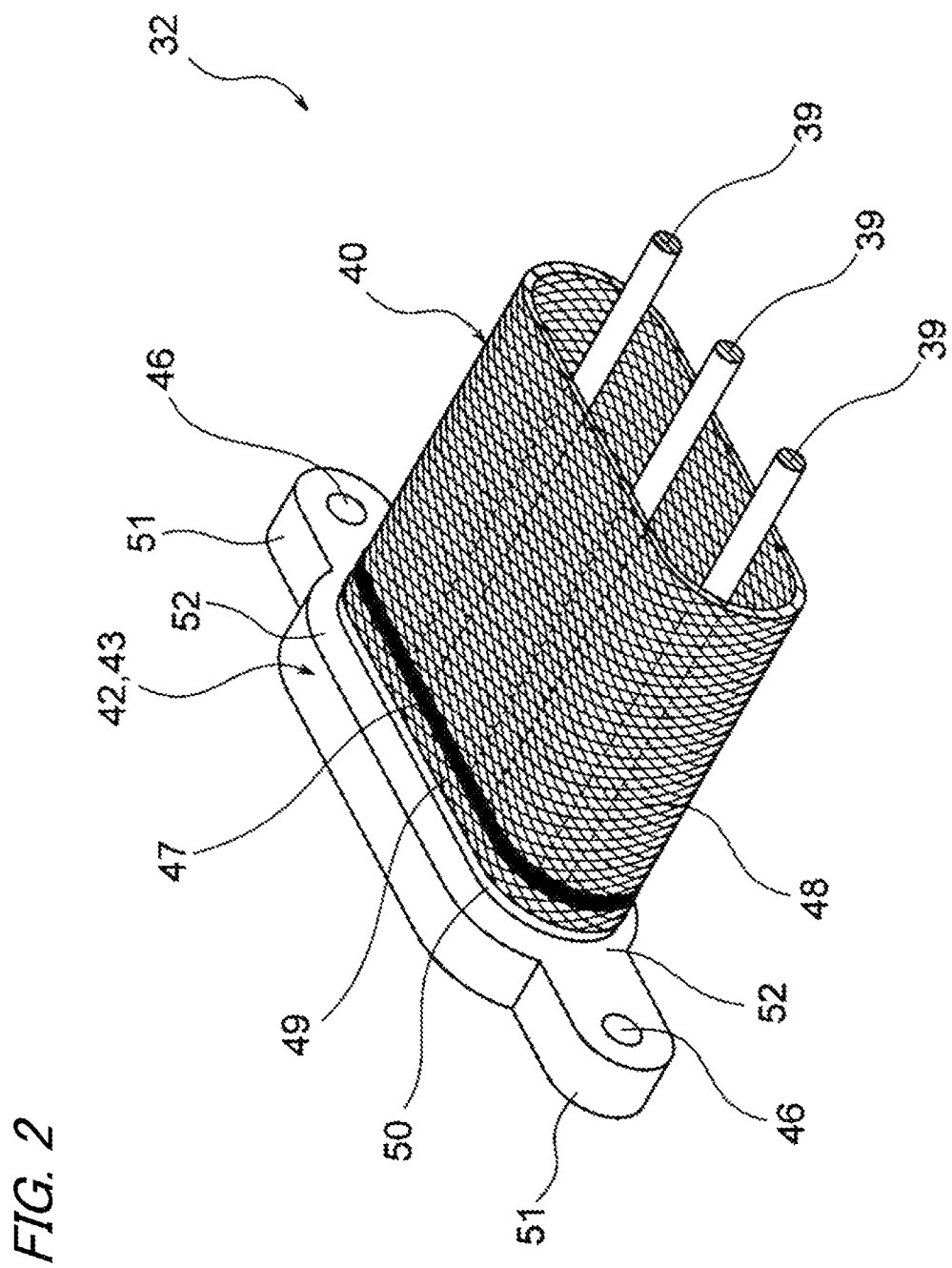
FIG. 2 is an enlarged perspective view of the shielding structure.
Figure 3:
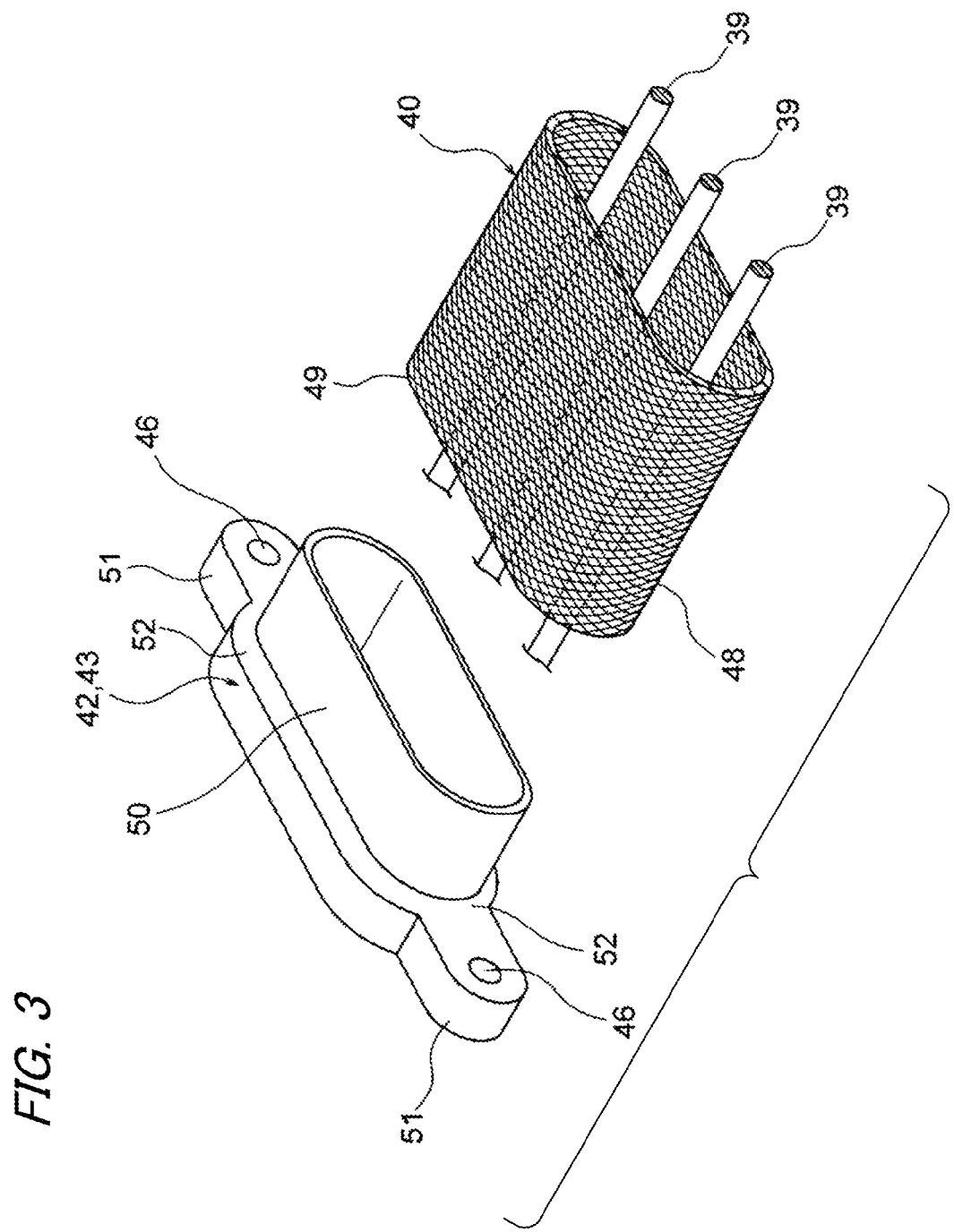
FIG. 3 is an exploded perspective view of the shielding structure of FIG. 2.
Figure 4A:
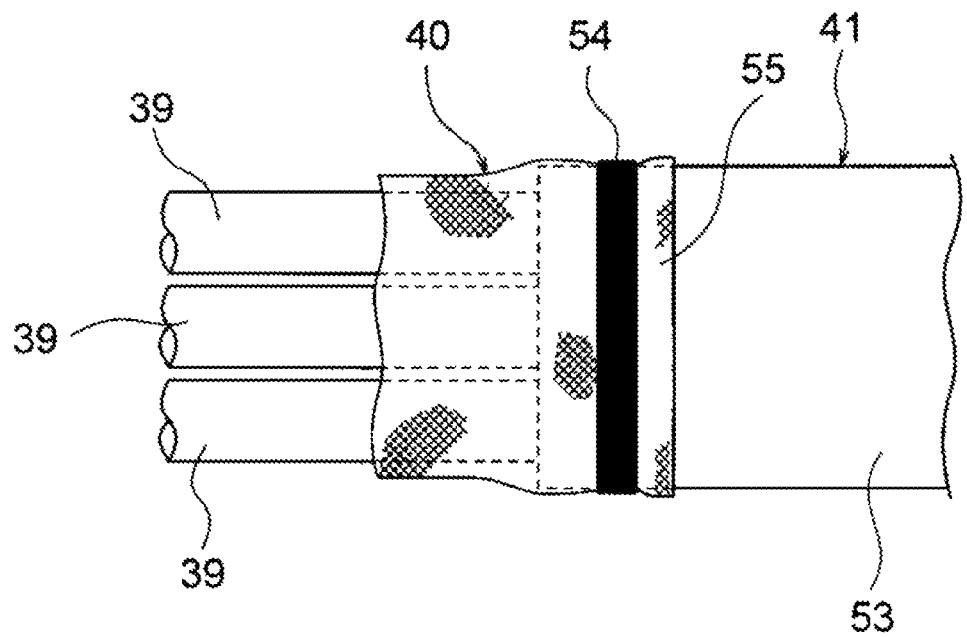
FIGS. 4A and 4B are diagrams of an exterior member.
Figure 4B:
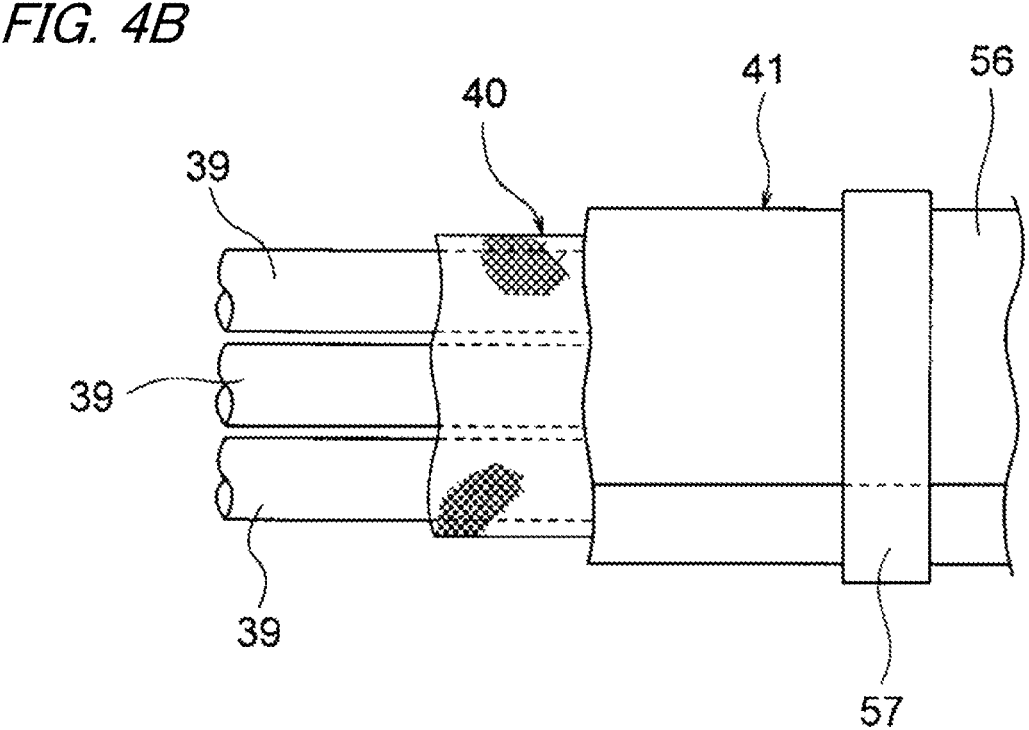

A first embodiment will hereinafter be described with reference to the drawings. FIGS. 1A and 1B are diagrams showing a shielding structure and a wire harness of the invention. Also, FIG. 2 is an enlarged perspective view of the shielding structure, and FIG. 3 is an exploded perspective view of the shielding structure of FIG. 2, and FIGS. 4A and 4B are diagrams of an exterior member.

In the present embodiment, an example of adopting the wire harness and the shielding structure of the invention in a hybrid vehicle (or may be an electric vehicle) shall be given and described.

In FIG. 1A, reference numeral 21 shows a hybrid vehicle. The hybrid vehicle 21 is a vehicle driven with a combination of an engine 22, a front motor unit 23 and a rear motor unit 24, and is constructed so that electric power from a battery 27 (a battery pack, an assembled battery) is supplied to the front motor unit 23 through a front inverter unit 25 and to the rear motor unit 24 through a rear inverter unit 26. The engine 22, the front motor unit 23 and the front inverter unit 25 are installed in an engine room 28 of a position having front wheels etc. in the embodiment. Also, the rear motor unit 24, the rear inverter unit 26 and the battery 27 are installed in a vehicle rear part 29 having rear wheels etc. The installation position is shown as one example. In addition, the battery 27 is not particularly limited as long as the battery 27 can be used in the hybrid vehicle 21, the electric vehicle, etc.

The front motor unit 23 is connected to the front inverter unit 25 by a high-voltage wire harness 30. Also, the front inverter unit 25 is connected to the battery 27 by a high-voltage wire harness 31. Further, the rear motor unit 24 is connected to the rear inverter unit 26 by a high-voltage wire harness 32. Furthermore, the rear inverter unit 26 is connected to the battery 27 by a high-voltage wire harness 33.

An intermediate part 34 of the wire harness 31 is cabled to the ground side of a vehicle body underfloor part 35. The wire harness 31 is cabled in substantially parallel along the vehicle body underfloor part 35. The vehicle body underfloor part 35 is a publicly known body and also is the so-called panel member, and a through hole (numeral is omitted) is formed in a predetermined position. This through hole forms the insertion portion of the wire harness 31.

An intermediate part 36 of the wire harness 32 is cabled so as to extend through a vehicle body underfloor part 37 in the vehicle rear part 29. A through hole into which the wire harness 32 is inserted is formed like the through hole of the wire harness 31. Reference numeral 38 shows a room inside.

In addition, the wire harness 30 is connected to the front motor unit 23 and also the wire harness 32 is connected to the rear motor unit 24, so that the wire harness may also be called a motor cable or a motor cable device.

The invention will hereinafter be described by taking the wire harness 32 as an example. The invention can be applied to the wire harnesses 30, 31, 33 as well as the wire harness 32.

In FIG. 1B, the wire harness 32 is configured to include three high-voltage electric wires 39 (conducting paths), a non-metallic fiber braid 40 for collectively shielding the three high-voltage electric wires 39, an exterior member 41 formed on the outside of a body part of the non-metallic fiber braid 40, a motor side connection 42 formed on one end side of the three high-voltage electric wires 39, and an inverter side connection 43 formed on the other end side.

In FIGS. 1B and 2, the high-voltage electric wire 39 is a high-voltage conducting path including a conductor and an insulator (coating), and is formed so as to have a length necessary for electrical connection. The conductor is made of copper or copper alloy, or aluminum or aluminum alloy. The conductor has a conductor structure formed by twisting strands or a bar-shaped conductor structure with a rectangular or circular cross section (for example, a conductor structure with a rectangular or circular single core and in this case, the electric wire itself also has a bar shape), and may have any of the conductor structures.

In addition, the embodiment uses the high-voltage electric wire 39, but is not limited to this high-voltage electric wire 39. That is, for example, a high-voltage conducting path formed by providing a publicly known bus bar with an insulator may be used.

The non-metallic fiber braid 40 is a tubular braid for electromagnetic shielding (a braid shielding member for measures against electromagnetic waves), and is formed in the shape in which the three high-voltage electric wires 39 can be covered over the whole length in the embodiment.

The non-metallic fiber braid 40 is formed by knitting multiple ultrathin strands made of non-metallic fibers which have conductivity and are lighter than metallic fibers. As the strand (as the non-metallic fiber), a strand made of a carbon fiber or a conductive resin fiber in which a conductive material is mixed with a resin material is used in the embodiment.

The non-metallic fiber braid 40 is made of non-metallic fibers whose strands are lighter than those of metallic fibers, for example, per unit length. Therefore, the non-metallic fiber braid 40 becomes lighter than the case of the strands made of metallic fibers. In addition, the strand is made of non-metallic fiber, so that the strand is not influenced by a rise in steel prices. A diameter of the strand is set properly.

A shielding structure according to the distal end of the wire harness 32 is the shielding structure formed by fixing one end and the other end (the distal ends) of the non-metallic fiber braids 40 to the motor side connection 42 and the inverter side connection 43 by welding. Also, the shielding structure is the shielding structure in which the non-metallic fiber braids 40 are connected to shield cases 44 and 45 through the motor side connection 42 and the inverter side connection 43.

Here, the shielding structure will be described more concretely. The motor side connection 42 and the inverter side connection 43 are conductive resin molded products molded by mixing a conductive material with a resin material and filling a molding mold with this mixed material, and the external appearance is molded in the same shape as that of a publicly known metal shell. The motor side connection 42 and the inverter side connection 43 are molded as conductive resin shells. In addition, the resin material and the conductive material are, for example, materials obtained by mixing carbon fiber with the resin material such as PBT.

Since the motor side connection 42 and the inverter side connection 43 which are the conductive resin molded products and the conductive resin shells have the same shape as that of the metal shell as described above, the connections 42, 43 have a function as a fixing member. Also, since the connections 42, 43 have the same shape as that of the metal shell, the connections 42, 43 have the shapes capable of being easily connected and fixed to the shield cases 44 and 45 (reference numeral 46 shows a through hole for bolting).

In the shielding structure described above, reference numeral 47 in the drawing shows a weld portion formed by welding an end 49 (distal end opening) in the distal end 48 of the non-metallic fiber braid 40. The weld portion 47 in the embodiment is formed by inserting the end 49 of the non-metallic fiber braid 40 into the outside of a tubular body 50 (see FIG. 3) of the motor side connection 42 and the inverter side connection 43 and then welding the periphery of the end 49 to an outer surface of the body 50 after this insertion. The welding includes welding by heat, welding by ultrasonic waves, etc. The weld portion 47 is formed so as to make one round of the outer surface of the body 50.

In addition, welding may be carried out partially in a circumferential direction without being limited to the one round. Also, a weld place is not limited to the outer surface of the body 50, and may be a plane part 52 of a fixing part 51 (see FIG. 3). The plane part 52 is formed as the planar portion arranged between the proximal end of the body 50 and through holes 46 of the fixing part 51.

In FIGS. 1B and 4A, the exterior member 41 is a member for protecting the three high-voltage electric wires 39 with the high-voltage electric wires 39 covered, and a pipe body 53 which is a conductive resin molded product corresponds to the exterior member 41 in the embodiment. The pipe body 53 is molded by mixing a conductive material with a resin material and filling a molding mold with this mixed material, or is molded by extrusion the resin material and the conductive material are, for example, materials obtained by mixing carbon fiber with the resin material such as PBT). The pipe body 53 is molded in, for example, a pipe shape with a circular cross section.

The non-metallic fiber braid 40 is fixed to the end of the pipe body 53 (exterior member 41) by welding. Reference numeral 54 shows a weld portion formed by welding an end 55 (distal end opening) of the non-metallic fiber braid 40. The weld portion 54 in the embodiment is formed like the weld portion 47.

The pipe body 53 of the embodiment is used as a shielding member. By welding and fixing the pipe body 53 to the non-metallic fiber braid 40, a shielding structure similar to the above is also formed in this portion of the pipe body 53.

In addition, the shielding structure is effective in, for example, the case of joining plural pipe bodies 53 to the non-metallic fiber braid 40. In this case, the non-metallic fiber braid 40 has a configuration and a structure having flexibility, so that the non-metallic fiber braid 40 has an advantage capable of forming the wire harness 32 bendable in a predetermined position.

Here, as the exterior member 41 other than the pipe body 53, for example, an example of using a twist tube 56 as shown in FIG. 4B is given. The twist tube 56 is formed as a tube wound on the outside of the non-metallic fiber braid 40 and is held by tape winding 57.

As described above with reference to FIGS. 1A to 4B, according to the invention, the shielding structure formed by using the non-metallic fiber braid 40 and welding the distal end of this non-metallic fiber braid 40 to the motor side connection 42, the inverter side connection 43 or the pipe body 53 which is the conductive resin molded product is obtained, so that the invention has effects capable of improving workability and reducing the number of components and reducing cost than ever before in the case of fixing the non-metallic fiber braid 40.

Also, the wire harness 32 according to the invention has an effect capable of providing the better wire harness 32 since the shielding structure described above is adopted.

Moreover, the wire harness 32 of the invention has an effect capable of contributing to improvement in fuel efficiency of the hybrid vehicle 21 to which this wire harness 32 is cabled since weight is saved by reducing the number of components.

Second Embodiment

Figure 5:
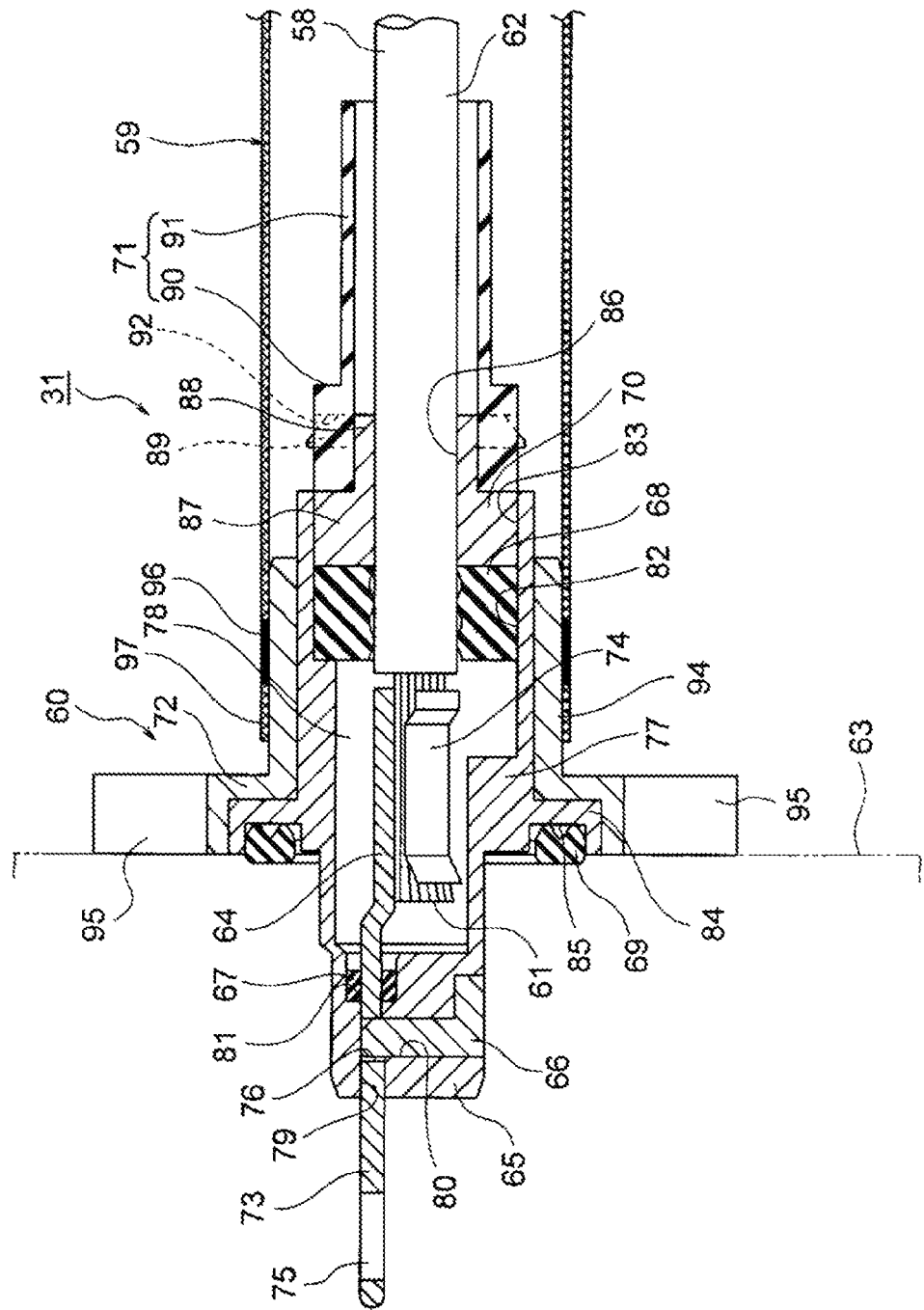
FIG. 5 is an enlarged sectional view of a shielding structure of another example according to the second embodiment.
Figure 6:
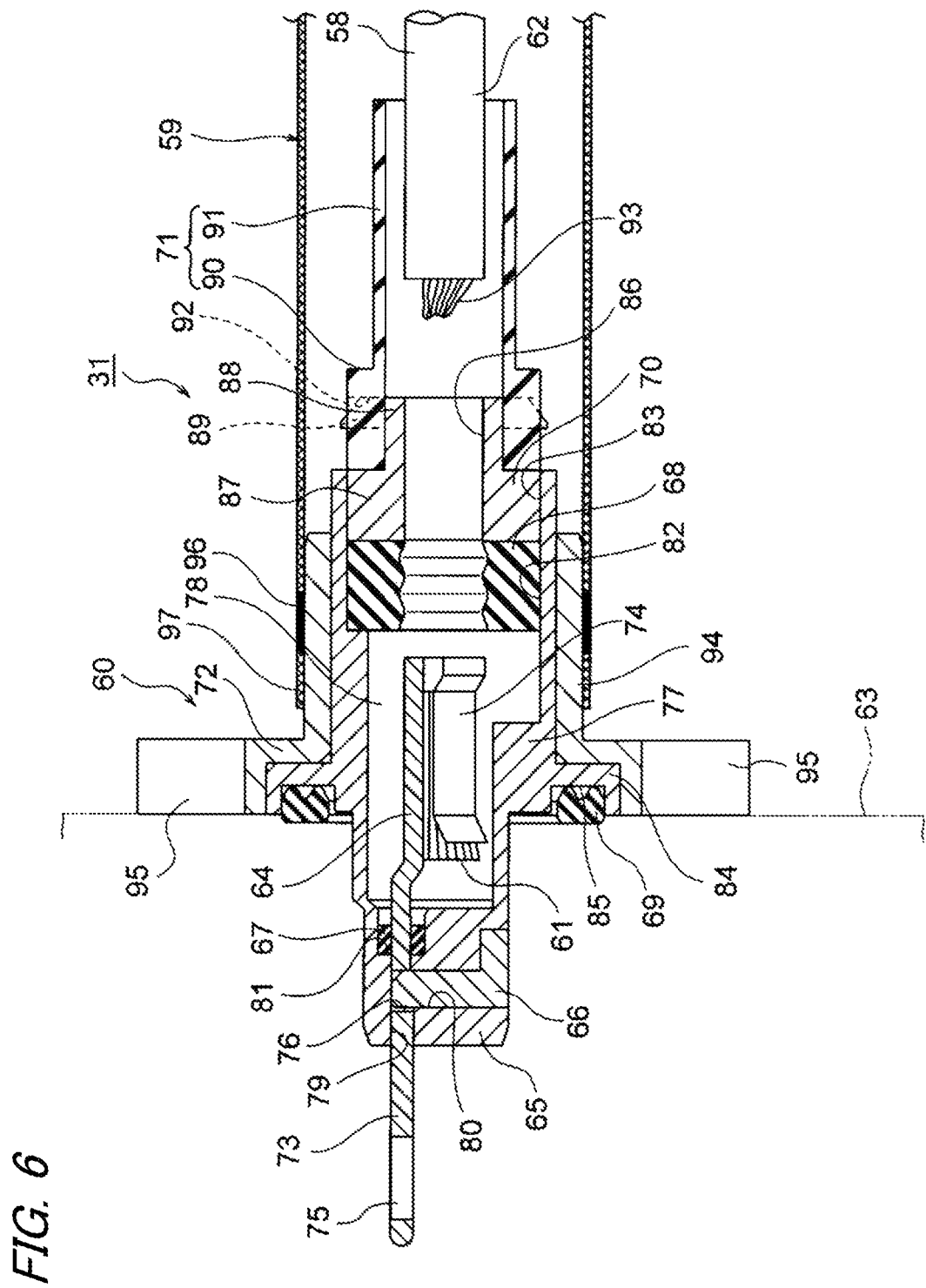
FIG. 6 is a sectional view showing a cut state of a high-voltage electric wire of FIG. 5.
Figure 7B:
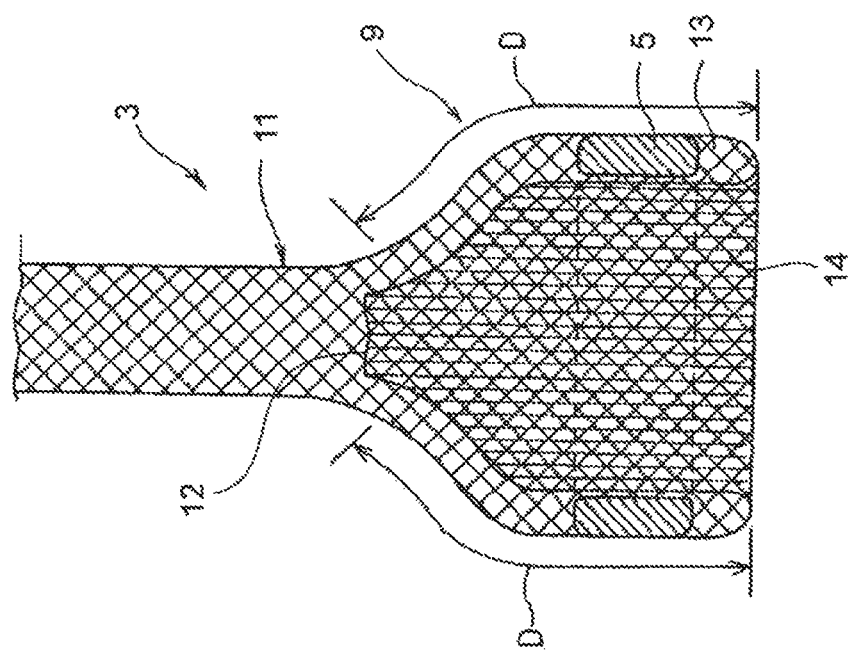
FIGS. 7A and 7B are diagrams showing a shielding structure of a conventional example.
Figure 7A:
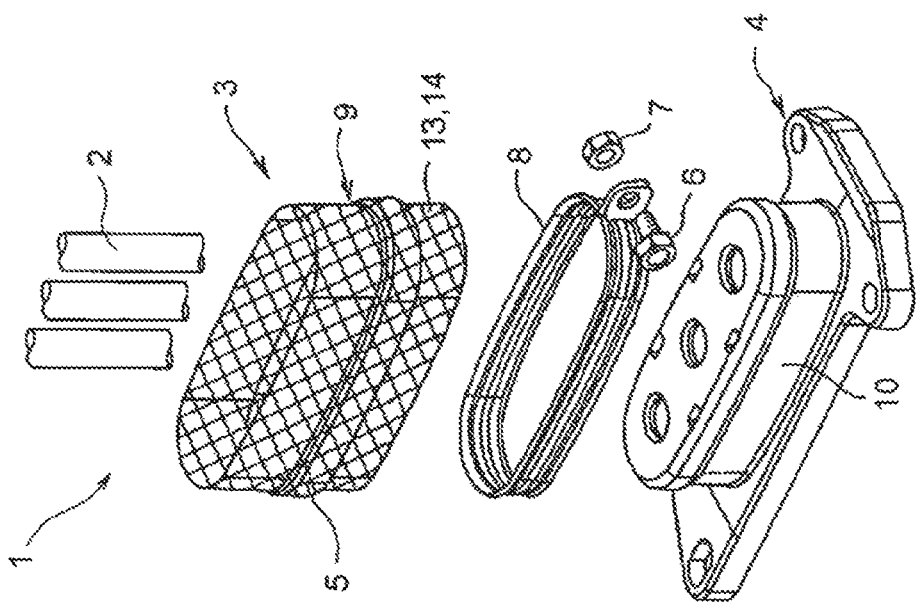

A second embodiment will hereinafter be described with reference to the drawings. FIG. 5 is an enlarged sectional view of a shielding structure of another example. Also, FIG. 6 is a sectional view showing a cut state of a high-voltage electric wire of FIG. 5.

In the second embodiment, a wire harness 31 rather than a wire harness 32 shall be given and described.

In FIG. 5, the wire harness 31 is configured to include two high-voltage electric wires 58 (conducting paths, and only one wire is shown herein), a non-metallic fiber braid 59 for collectively shielding the two high-voltage electric wires 58, an exterior member (not shown) formed on the outside of the non-metallic fiber braid 59, an inverter side connection 60 formed on one end side of the high-voltage electric wires 58, and a battery side connection (not shown) formed on the other end side. The battery side connection (not shown) is configured like the inverter side connection 60 basically.

The high-voltage electric wire 58 is configured to include a conductor 61 and an insulator 62 with which this conductor 61 is coated. The high-voltage electric wire 58 is processed so that the insulator 62 is peeled in the distal end of this high-voltage electric wire 58 by a predetermined length and the conductor 61 is exposed. As the conductor 61, a conductor structure formed by twisting strands (strands made of copper or copper alloy, or aluminum or aluminum alloy) is used herein. The conductor 61 is not particularly limited and is formed in a shape with substantially a circular (round) cross section. In addition, the conductor 61 may have a bar-shaped conductor structure with a rectangular or circular cross section (for example, a conductor structure with a rectangular or circular single core). Also, the conductor 61 may have, for example, a conductor structure made of a braid bus bar.

The insulator 62 is formed by extruding a resin material having insulation properties to the outside of the conductor 61 and coating the conductor 61, and a publicly known insulator is used herein.

The high-voltage electric wire 58 is formed in a thick electric wire since the electric wire 58 is used for high voltage.

The non-metallic fiber braid 59 is a member for performing an electromagnetic shielding function, and is formed in a tubular shape. As the non-metallic fiber braid 59 of the present embodiment, basically the same braid as the non-metallic fiber braid 40 (see FIG. 2) of the first embodiment is used. One end (distal end) of the non-metallic fiber braid 59 is fixed to a conductive resin molded product 72 (described below) of the inverter side connection 60 by welding. Also, the other end (distal end) is similarly fixed to the battery side connection (not shown).

The inverter side connection 60 is the so-called connector, and is constructed so as to be inserted into a shield case 63 of a front inverter unit 25 and make electrical connection in the inside. The inverter side connection 60 is configured to include a terminal fitting 64, a housing 65, a terminal locking member 66, waterproof sealing members 67 to 69, a rear holder 70, an insulating cover 71, the conductive resin molded product 72, and a bolt for fixing (not shown).

The terminal fitting 64 is formed by pressing a metal plate having conductivity. As the terminal fitting 64, a male terminal fitting is used herein. The terminal fitting 64 has an electrical contact part 73, and an electric wire connection 74 continuous with this electrical contact part 73.

The electrical contact part 73 is formed in a tab shape. A first through hole 75 and a second through hole 76 are formed in the electrical contact part 73. The first through hole 75 is formed as the portion used in electrical connection inside the front inverter unit 25. On the other hand, the second through hole 76 is formed as the portion locked by the terminal locking member 66.

The electric wire connection 74 is formed so that the conductor 61 of the high-voltage electric wire 58 can be connected and fixed. In the embodiment, the electric wire connection 74 has a barrel shape and is formed so that the conductor 61 can be crimped and connected by crimping (connection can be made by, for example, welding).

The housing 65 is a resin molded product (an insulating member) having insulation properties, and has a housing body 77, and is formed in the illustrated shape (the shape is shown as one example).

A terminal receiving chamber 78 is formed inside the housing body 77. The terminal receiving chamber 78 is formed so that the electric wire connection 74 of the terminal fitting 64 connected and fixed to the conductor 61 of the high-voltage electric wire 58 can be received mainly. An electrical contact part lead-out hole 79 pierced toward the housing top is formed in the terminal receiving chamber 78. When the terminal fitting 64 is received in the terminal receiving chamber 78, the electrical contact part 73 projects from the housing top through the electrical contact part lead-out hole 79.

A terminal locking member receiving hole 80 communicating with the electrical contact part lead-out hole 79 is formed in the housing body 77 from the lower side toward the upper side. The second through hole 76 is locked by the terminal locking member 66 fitted into the terminal locking member receiving hole 80 and thereby, the terminal fitting 64 is retained.

A sealing member receiving hole 81 is formed in the portion of continuity between the terminal receiving chamber 78 and the electrical contact part lead-out hole 79. The sealing member 67 received in the sealing member receiving hole 81 is constructed so as to make watertight contact with the electrical contact part 73.

A sealing member receiving hole 82 is formed so as to continue with the rear of the terminal receiving chamber 78. Also, a rear holder receiving hole 83 is formed continuously with the rear of the receiving hole 82. The sealing member 68 received in the sealing member receiving hole 82 is constructed so as to make watertight contact with the insulator 62 of the high-voltage electric wire 58. The rear holder receiving hole 83 is formed in the shape capable of fitting the rear holder 70.

A flange part 84 is formed on the outside of the housing body 77. A sealing member receiving groove 85 is formed in this flange part 84. The sealing member 69 received in the sealing member receiving groove 85 is constructed so as to make watertight contact with the shield case 63 of the front inverter unit 25.

The rear holder 70 is a resin molded product having insulation properties, and is formed in the shape capable of being divided into two pieces (not particularly shown). The rear holder 70 has an electric wire insertion hole 86 pierced according to a diameter of the high-voltage electric wire 58, a large-diameter fitting part 87 fitted into the rear holder receiving hole 83, a small-diameter electric wire pull-out part 88 for pulling out the high-voltage electric wire 58 continuously with this fitting part 87, and a locking protrusion 89, for example, vertically projected and formed on the end of the electric wire pull-out part 88. The locking protrusion 89 is formed so that the insulating cover 71 can be inhibited from coming out by hooking the insulating cover 71.

The insulating cover 71 is formed as a member separate from the rear holder 70. Also, the insulating cover 71 is formed as the member having flexibility, which is the member made of rubber (member made of elastomer) herein. The insulating cover 71 is formed in a tubular shape, and has a large-diameter locking part 90 and a cover part 91 backward extending from this locking part 90. A locking recess 92 hooked and locked in the locking protrusion 89 of the rear holder 70 is formed in the locking part 90. The insulating cover 71 is formed in the shape in which the insulating cover 71 is locked in the rear holder 70 even when the insulating cover 71 is rotated 180° and is turned upside down.

It can be said that the insulating cover 71 is an effective member in the case of applying an external force etc. to the wire harness 31. This reason will hereinafter be described.

In the case of applying an external force etc. to the wire harness 31, the force is applied to the portion of connection between the conductor 61 of the high-voltage electric wire 58 and the electric wire connection 74 of the terminal fitting 64. Then, the conductor 61 in the connection portion is cut as shown in FIG. 6. Concretely, a part of the conductor 61 is left in the crimp portion in the electric wire connection 74 and also, the side of the high-voltage electric wire 58 is cut in a state in which a conductor cut end 93 is exposed. Though the conductor cut end 93 is exposed in the high-voltage electric wire 58 at this time, the outside of the conductor cut end 93 is covered with the insulating cover 71, so that electrical contact with the non-metallic fiber braid 59 becomes regulated. Or, when the amount of movement is small, the outside of the conductor cut end 93 is covered with the housing body 77 or the fitting part 87 or the electric wire pull-out part 88 in the rear holder 70 and thereby the electrical contact becomes regulated.

Therefore, the conductor cut end 93 can be prevented from being exposed by the presence of the insulating cover 71 etc. to ensure safety, so that it can be said that the insulating cover 71 is the effective member in the case that the external force etc is applied to the wire harness 31.

The conductive resin molded product 72 is an alternative to the so-called metal shell (shield shell), and is molded by mixing a conductive material with a resin material and filling a molding mold with this mixed material. The conductive resin molded product 72 has substantially a tubular molded product body 94 (a shell body), and plural molded product fixing parts 95 (shell fixing parts). The molded product body 94 is formed in the shape in which the housing body 77 can be received inside this molded product body 94. The molded product fixing part 95 is formed in the shape of being fixed to the shield case 63 of the front inverter unit 25 using a bolt for fixing (not shown).

The distal end (distal end opening) of the non-metallic fiber braid 59 is fixed to the molded product body 94 by welding. In addition, reference numeral 96 in the drawing shows a weld portion in the distal end of the non-metallic fiber braid 59.

The weld portion 96 in the embodiment is formed by inserting an end 97 of the non-metallic fiber braid 59 into the outside of the molded product body 94 and then welding the periphery of the end 97 to an outer surface of the molded product body 94 after this insertion. The welding includes welding by heat, welding by ultrasonic waves, etc. The weld portion 96 is formed so as to make one round of the outer surface of the molded product body 94.

In addition, welding may be carried out partially in a circumferential direction without being limited to the one round. Also, a weld place is not limited to the outer surface of the molded product body 94, and may be a plane part 98 of the molded product fixing part 95.

The shielding structure as described above naturally has an effect similar to that of the first embodiment. That is, the shielding structure formed by using the non-metallic fiber braid 59 and welding the distal end of this non-metallic fiber braid 59 to the molded product body 94 of the conductive resin molded product 72 is obtained, so that the shielding structure has effects capable of improving workability and reducing the number of components and reducing cost than ever before in the case of fixing the non-metallic fiber braid 59.

Also, the wire harness 31 according to the invention has an effect capable of providing the better wire harness 31 since the shielding structure described above is adopted.

Moreover, the wire harness 31 of the invention has an effect capable of contributing to improvement in fuel efficiency of a hybrid vehicle 21 to which this wire harness 31 is cabled since weight is saved by reducing the number of components.

It is apparent that various modifications can be made in the invention within a scope not deviating from the gist of the invention.

The present invention is useful for providing a shielding structure and a wire harness capable of improving workability and also reducing the number of components and further reducing cost in the case of fixing a braid which is a shielding member.

What is claimed is:

1. A shielding structure, comprising:
   a first conductive resin molded product;
   a second conductive resin molded product;
   a non-metallic fiber braid, formed in a tubular shape by using multiple ultrathin strands made of conductive non-metallic fibers;
   a first weld that secures a first distal end of the non-metallic fiber braid to the first conductive resin molded product; and
   a second weld that secures a second distal end of the non-metallic fiber braid to the second conductive resin molded product,
   wherein the first distal end and the second distal end are opposite ends of the non-metallic fiber braid in axial direction of the non-metallic fiber braid.

2. A shielding structure as claimed in claim 1, wherein the non-metallic fiber is a carbon fiber or a conductive resin fiber in which a conductive material is mixed with a resin material.

3. A shielding structure as claimed in claim 1, wherein the first conductive resin molded product is a fixing member configured to be fixed to the another member having conductivity.

4. A shielding structure as claimed in claim 1, wherein the second conductive resin molded product is a pipe body having conductivity and the non-metallic fiber braid circumscribes the pipe body.

5. A wire harness, comprising:
   one or plural conducting paths;
   a non-metallic fiber braid formed in a tubular shape using multiple ultrathin strands made of conductive non-metallic fibers, the non-metallic fiber braid with which the one or plural conducting paths are covered;
   a conductive resin molded product;
   a first weld that secures a first distal end of the non-metallic fiber braid; and
   a second weld that secures a second distal end of the non-metallic fiber braid, wherein the first distal end and the second distal end are opposite ends of the non-metallic fiber braid in axial direction of the non-metallic fiber braid.

6. A shielding structure as claimed in claim 2, wherein the first conductive resin molded product is a fixing member configured to be fixed to another member having conductivity.

7. A shielding structure as claimed in claim 2, wherein the second conductive resin molded product is a pipe body having conductivity and the non-metallic fiber braid circumscribes the pipe body.

* * * * *